United States Patent [19]

Ludwiczak et al.

[11] Patent Number: 5,513,171
[45] Date of Patent: Apr. 30, 1996

[54] ARRANGEMENT FOR DYNAMICALLY DERIVING A TELEPHONE NETWORK MANAGEMENT DATABASE FROM TELEPHONE NETWORK DATA

[75] Inventors: Karen M. Ludwiczak, Holmdel; Louis M. Martz, Rumson; Patricia Hart Wilson, Red Bank, all of N.J.

[73] Assignee: AT&T Corp., Murray Hill, N.J.

[21] Appl. No.: 280,421

[22] Filed: Jul. 26, 1994

[51] Int. Cl.[6] .................................................... H04J 3/14
[52] U.S. Cl. .............................. 370/13; 370/54; 370/94.3; 379/14; 379/15; 379/219
[58] Field of Search ............................... 370/13, 16, 16.1, 370/54, 55, 58.2, 60, 60.1, 58.1, 85.13, 85.14, 94.1, 94.2, 94.3; 379/1, 9, 14, 15, 16, 22, 32, 33, 219, 220, 221; 371/8.1, 8.2, 11.1, 11.2; 359/115, 135, 137

[56] References Cited

U.S. PATENT DOCUMENTS

| | | | |
|---|---|---|---|
| 4,748,658 | 5/1988 | Gopal et al. | 379/221 |
| 4,825,206 | 4/1989 | Brice, Jr. et al. | 370/16 X |
| 4,979,118 | 12/1990 | Kheradpir | 370/54 X |
| 4,991,204 | 2/1991 | Yamamoto et al. | 379/221 |
| 5,049,873 | 9/1991 | Robins et al. | 379/14 X |
| 5,381,403 | 1/1995 | Maher et al. | 370/13 |
| 5,384,768 | 1/1995 | Fuji | 370/54 X |
| 5,390,335 | 2/1995 | Stephan et al. | 370/58.2 X |
| 5,410,586 | 4/1995 | Davies | 379/14 |

Primary Examiner—Douglas W. Olms
Assistant Examiner—Russell W. Blum
Attorney, Agent, or Firm—Frederick B. Luludis

[57] ABSTRACT

A network management facility is adapted so that it obtains information including connectivity data as well as the identities of discrete network elements from an associated network and then uses the information to determine the configuration of the network. The management facility then generates, for storage in a network management database, data records characterizing the configuration of the network, as defined by the components, circuits, etc., forming the network. Once the database has been created in this manner, the network management system may then use the contents of the database to provision requests entered by network users, for example, a request for additional transmission bandwidth. The database may also be used to evaluate a network condition, such as a condition characterized by a trouble alarm. Further, the network management system automatically updates the contents of the database to reflect a change in the associated network, thereby eliminating the need to rely on personnel to perform that task.

3 Claims, 8 Drawing Sheets

ARRANGEMENT FOR DYNAMICALLY DERIVING A TELEPHONE NETWORK MANAGEMENT DATABASE FROM TELEPHONE NETWORK DATA

FIELD OF THE INVENTION

The invention relates to determining dynamically the configuration of a telephone network for network: management purposes.

BACKGROUND OF THE INVENTION

A network management database typically contains a model of the configuration of an associated network that may be used to (a) isolate faults in the network by analyzing network alarm and event messages and (b) provision network services. Such a database is usually characterized by a plurality of data records defining respective objects (e.g., equipment, circuits, transmission facilities, etc.,) composing the network. The data contained in the records is usually derived manually using other data records that are stored in databases associated with respective Network Elements (NE) forming respective sections of the network. Telephone personnel use the data that is stored in the NE databases and their knowledge of the network to manually construct and update the contents of the records forming the network management database. It can be appreciated that if the content of a network management database is not kept current, then the efficiency of repairing faults and provisioning of services may be degraded. Moreover, the task of manually creating and maintaining such a database is labor intensive.

SUMMARY OF THE INVENTION

We have recognized that a knowledge-based system may be used to identify discrete network elements and connectivity data to determine the configuration of the network from such data and then generate automatically, for storage in a network management database, data records characterizing the configuration of the network, as defined by the components, circuits, etc., forming the network. Once the database has been created in this manner, its contents may be readily updated automatically as the network changes. Accordingly, the need to rely on telephone personnel to perform the task of populating and updating the records forming a network management database is virtually eliminated.

DETAILED DESCRIPTION

Figure 1:
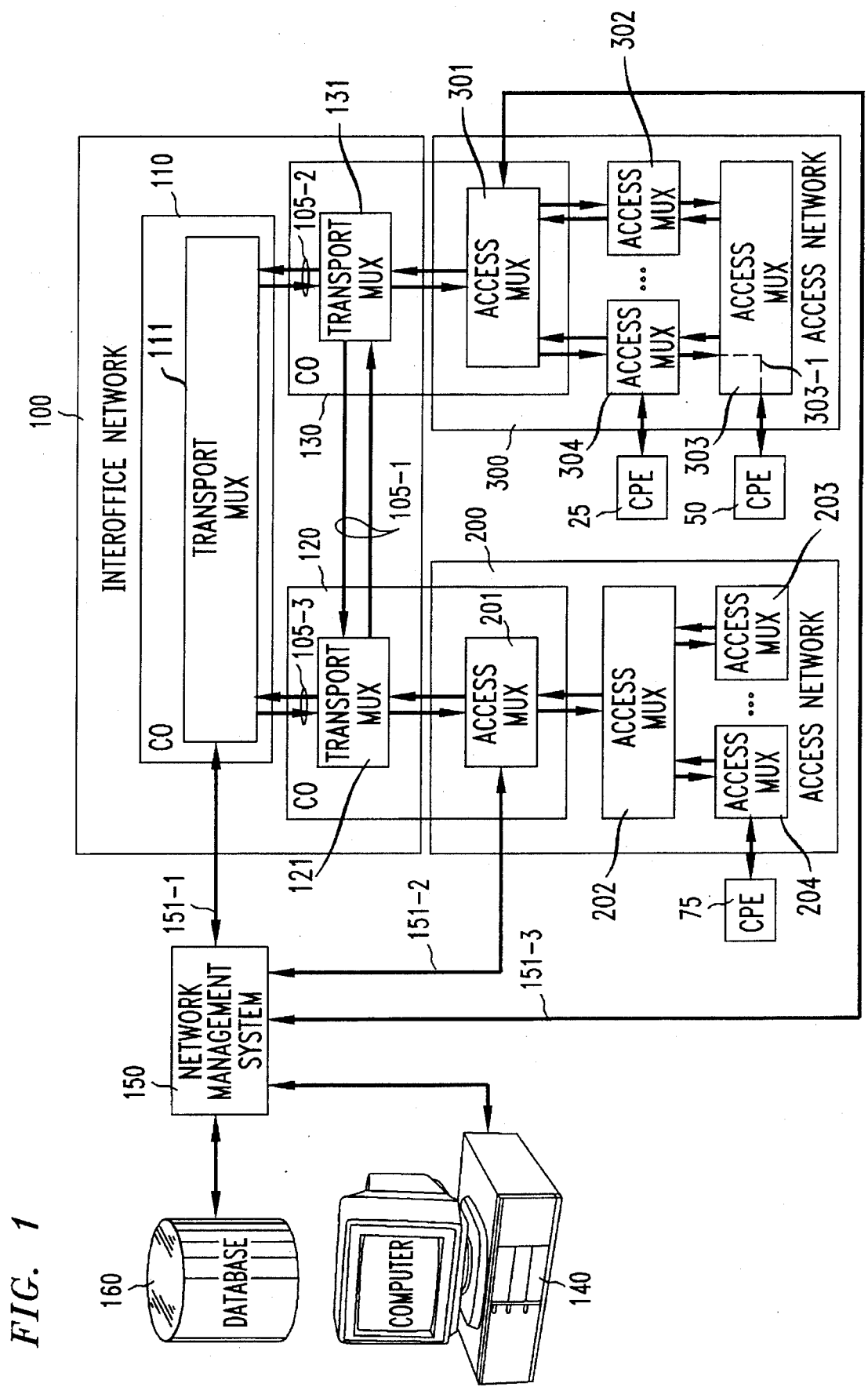
FIG. 1 illustrates a telecommunications network in which the principles of the invention may be practiced.
Figure 2:
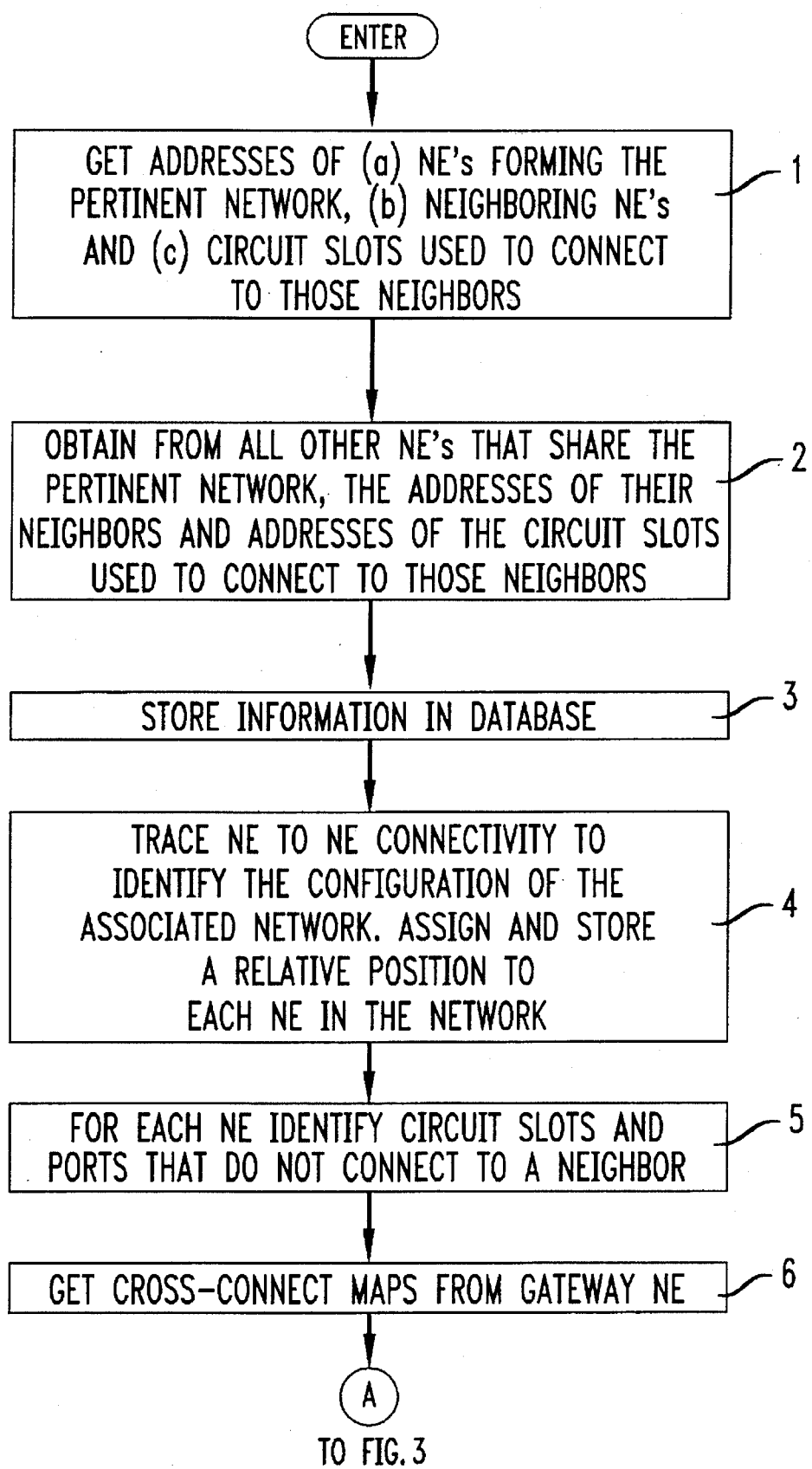
FIGS. 2 through 6 illustrate in flow chart form the programs which implement the principles of the invention in the network of FIG. 1.
Figure 3:
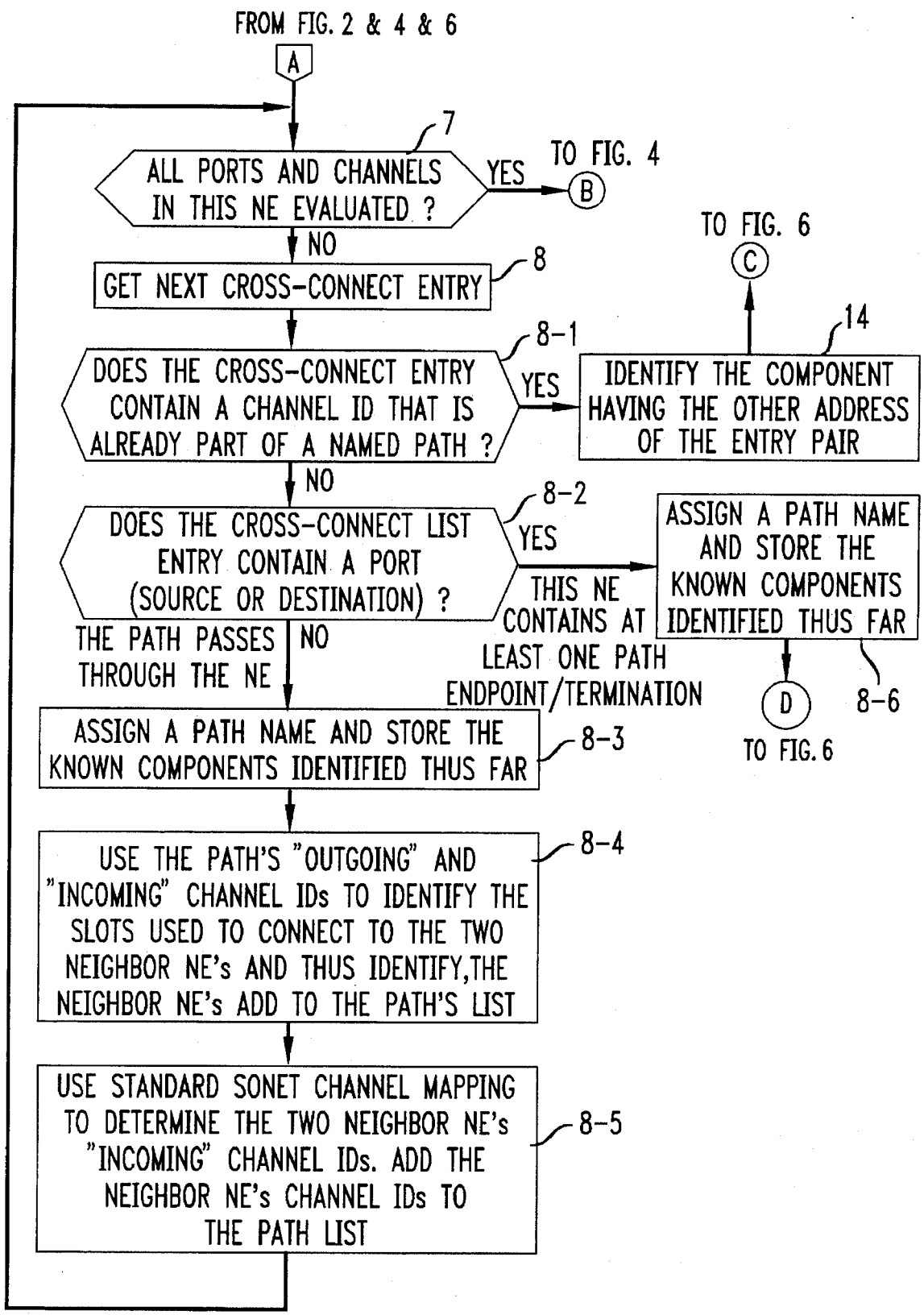

Turning now to FIG. 1, there is shown an illustrative embodiment of a telecommunications network 100 that is formed from a number of Central Offices (CO), three of which are shown in FIG. 1, namely COs 110, 120 and 130. The COs are interconnected via respective communications paths to provide for the exchange of communications. One such communications path that may be used to interconnect Central Offices (CO) 110, 120 and 130 as an interoffice network is optical fiber. Accordingly, the claimed invention will be discussed in the context of the channel capacity of optical fiber. However, that should not be construed as being a limitation of the claimed invention, since the claimed invention may be readily used in conjunction with networks that are interconnected via some other transmission media, e.g., coax cable.

Continuing, network 100, comprising COs 110, 120 and 130, operates to transport a large amount of data at a very high rate of speed between access networks. To do so, COs 110, 120 130 are interconnected via respective optical fiber pairs 105-1, 105-2 and 105-3, in which a pair of such fibers may operate at a very high transmission rate, for example, the transmission rate that is associated with a Synchronous Optical NETwork (SONET). Each CO may thus include a lightwave multiplexer, which may be, for example, the model FT2000 G lightwave multiplexer available from AT&T, to switch information arriving via an incoming circuit (channel) of an optical fiber to an outgoing circuit (channel) of another optical fiber. For example, multiplexer 131 may be arranged to switch data traffic received via a circuit, or channel, of optical fiber pair 105-2 to a channel of optical fiber pair 105-1 for delivery to CO 120 and thence to a particular destination, e.g., access network 200. When such information is received at a multiplexer, e.g., multiplexer 121 via path 105-1, then multiplexer 121, in a conventional manner, switches (i.e., "drops") the traffic at a particular rate, for example, at a DS3 rate, to multiplexer 201, which may be considered to be an element of access network 200, in which network 200 (as well as network 300) may be, for example, the model DDM2000 multiplexer also available from AT&T. Assuming that the ultimate destination of such traffic is Customer Premises Equipment 75, then MUltipleXer (MUX) 201 multiplexes the traffic arriving at a DS3 rate to a channel having a higher capacity, e.g., a 155.52 Mb/sec channel, for transport to hub MUX 202. MUX 202, in turn, transports the traffic to MUX 204 at the same rate for delivery to CPE 75 at one of a number of different rams controlled by the CPE, for example, a DS1 rate. Information received from CPE 75 is transported to CO 120 in a similar manner but in an opposite direction.

Traffic that is destined for either CPE 25 or CPE 50 is similarly transported over interoffice network 100 and supplied to access network 300 in a similar manner. In contrast to access network 200, however, access network 300 is configured as a conventional ring network formed by access multiplexers 302 through 304 and includes access multiplexer 301. Thus, an access network may be configured as a hub network, e.g., network 200; ring network, e.g., network 300; linear chain (not shown), etc. Briefly, a hub network may be defined as a network in which one Network Element (NE) (hereinafter also MUX) has three or more NEs as neighbors, i.e., the hub, and all of the other NEs have just one neighbor. A simple ring network, on the other hand, may be defined as a network in which each NE has two neighbors and linear chain network may be defined as a network in which the NEs at respective ends of the chain have just one neighbor and all of the other NEs in the network have two neighbors.

Over the course of time the configuration of a particular network, e.g., an access network, may change. Such a change may occur for a number of different reasons. For example, the number of elements forming an access network may increase as a result of adding an access multiplexer thereto, or the number of DS1 circuits needed by a particular CPE may either increase or decrease. Moreover, the configuration of the interoffice network may also change. For example, the interoffice network may grow as a result of connecting a new CO via an associated lightwave multiplexer to the network.

As part of the management of a network, the configuration and identity of each of the components forming the network (e.g., multiplexers, transmission circuits and other equipments) are stored in a database, e.g., database 160 controlled by network management system 150. This is done, inter alia, so that an associated network management system 150 may identify, for example, which components are idle and which are being used in a circuit assigned to a respective CPE. Thus, when a particular customer requests, for example, an increase in the bandwidth of a transmission channel serving an associated CPE, then Network Management System (NMS) 150, based on its knowledge of the current configuration and capacity of the network, may assign idle channel capacity to that CPE. Priorly, the task of updating a network management database to ensure that the data stored therein was current was done manually as the configuration of an interoffice network or access network changed. It can be appreciated that as a result of performing that task manually, it is likely that the contents of the database would not be current and, in certain instances, possibly incorrect. It can also be appreciated that such a task is labor intensive.

To deal with that problem, we have recognized that, in accord with an aspect of the invention, a knowledge-based system may be used to identify discrete elements of a network including multiplexers, transmission circuits, etc., and thus derive the configuration of the network. The knowledge-based system may, in accord with another aspect of the invention, generate data records identifying such elements and configuration for storage in database 160 so that they may be readily accessed by management system 150 for the foregoing reasons. Once the database is populated in this manner, then its contents may be readily updated in the same manner, as will be discussed below. Accordingly, the task of manually creating and updating a telecommunications network management database may be virtually eliminated.

The foregoing may be achieved by arranging Network Management System (NMS) 150 so that it communicates with each network that it supports to identify, inter alia, the elements forming the network, and for each such element (a) the way it is equipped, (b) its neighbors and (c) its configuration. Based on that information, NMS 150 may then determine, in accord with an aspect of the invention, the interconnections between neighboring elements and the configuration of the associated network. NMS 150 may then store data indicative of such identities, interconnections and configuration in its associated database 160. Thereafter, NMS 150 may update the database automatically whenever the configuration of the associated network changes, in which the change may occur as a result of, for example, a particular customer request, e.g., a request entered by CPE 25, 50 or 75.

More specifically, NMS 150 communicates with a network, e.g., network 100, via one of the network multiplexers that may be optionally designated as a network gateway for the purpose of interfacing with NMS 150. It is assumed for illustrative purposes that MUX 111 is designated the gateway for network 100. To that end, MUX 111 may communicate with NMS 150 via communications path 151-1 using, for example, the well-known X.25 data communications protocol or any other protocol supported by the network elements. It also assumed that MUX 201 and MUX 301 are designated the gateways for networks 200 and 300, respectively, and communicate with NMS 150 via paths 151-2 and 151-3, respectively.

When a MUX, e.g. MUX 111, is designated as the gateway for its associated network, it then becomes responsible for monitoring a particular transmission channel (e.g., a so-called overhead channel) provided by the associated transmission media, e.g., communications path 105, for messages that may be generated by another element of the same network. Such a message may contain configuration, alarm, or event data indicative of the operational state of the element that generates the message. The gateway MUX then reformats the message for transmission over the X.25 communications path that connects the gateway MUX to NMS 150, e.g., path 151-1.

Assume now that a new access network, e.g., network 300, is being built and is to be connected to interoffice network 100 in the manner shown in FIG. 1. As the network is being built and as each new access MUX 302, 303 or 304 is connected to the network, it is initialized in accord with conventional procedures. Such procedures include, for example, the storage of an initial cross-connect map in memory internal to the new access MUX. As is well-known, a MUX uses an associated cross-connect map to determine the routing of data traffic through the MUX, i.e., from an input port (circuit) and associated channel to an output port and associated channel. Accordingly, when the MUX receives data via a particular incoming channel, it uses its cross-connect map and address of that channel to translate the address of the input port and address of input channel into the address of an outgoing port and channel to which the data is to be forwarded. The MUX then forwards the data toward its intended destination via the identified output port and channel. It is noted that a cross-connect map is associated with a particular data rate, which means that a plurality of cross-connect maps may be associated with respective data rates, e.g., SONET, VT1.5, STS1, etc., DS1, DS3, etc. In that case, then, such maps would be stored in the memory of each network element, e.g., MUX 304, of the associated network processing those data rates.

The above-mentioned initialization procedure also activates system software that directs the overall operation of the MUX including the transmitting of administrative and routing information to the other elements of the network. Such administrative information includes the identity of the new MUX. Accordingly, then, when a new access MUX, e.g., MUX 304, is connected to its associated network and then activated, it broadcasts its identity over both directions of the ring network to the other elements of network 300. When a priorly activated MUX, e.g., MUX 303, receives the message, it stores the identity in its internal memory and notes the value of a so-called "hop count" (or relative network position) contained in the message, in which the contents of the message is indicative of the position of the new MUX 304 in network 300. That is, if the message indicates that the receiving MUX is a neighbor of the newly added MUX 304, then the receiving MUX notes that fact in its internal memory. The receiving MUX then transmits the message over the overhead channel of each outgoing communications path. When all of the network elements (MUXs) have been installed—interconnected to one another and initialized indicating that the network is ready to be placed into service—then an administrator designates one of the access MUXs of network 300 as the gateway and connects that MUX to NMS 150 via data path 151. In addition, the administrator notifies NMS 150 of the new network and stores information defining the network address, identification and password of the newly designated gateway in database 160.

(It is noted that the gateway element (MUX) associated with the newly added MUX also receives the identity message via the associated overhead channel and stores that information in its memory. In addition, the gateway MUX may then send a message identifying the new MUX to NMS 150. MS 150, in turn, may then send a message to the newly identified MUX requesting further identification of the element and a copy of its cross-connect map. NMS 150 may also request copies of the cross-connect maps stored in the other elements of the network. This procedure may be invoked in other instances, such as when a new transmission media is placed into service.)

Figure 7:
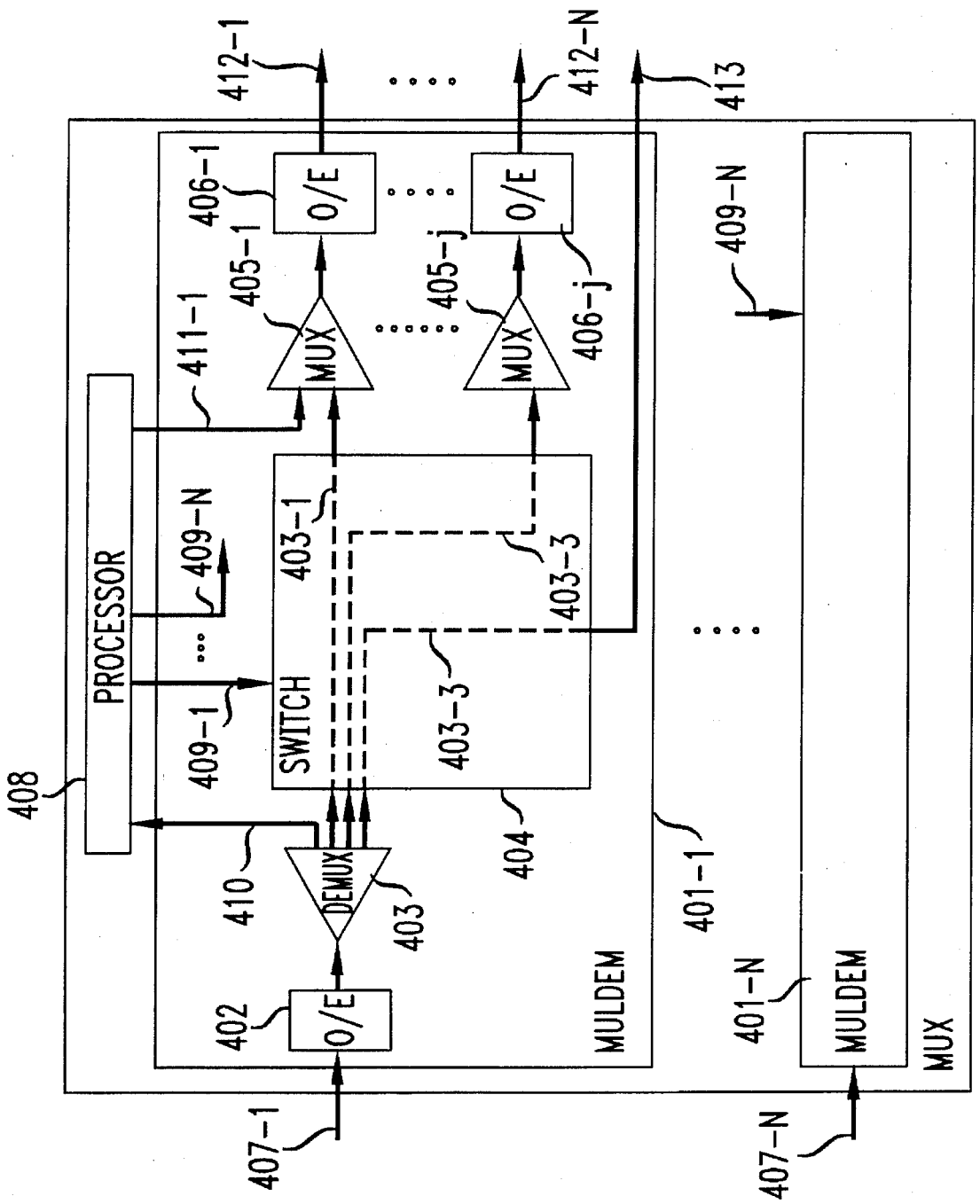
FIG. 7 is a simplified block diagram of a network element of FIG. 1.

In response to such notification, MS 150 invokes a process that, in accord with an aspect of the invention, builds a model of network 300 and stores the model in database 160. MS 150 thereafter updates the model as the new network changes and uses the model to support the operations of the new network, including the provisioning of transmission circuits in response to a customer request. Such a model comprises a data record for each circuit, transmission channel, network element, etc., that form the respective network, as mentioned above. (An example of such data records are shown in FIG. 7 as will be discussed below.)

The process that is used to acquire such information for storage in database 160 is actually composed of a number of subprocesses. A first subprocess, more particularly, identifies, inter alia, the (a) elements forming a network, e.g., network 300, and (b) transmission facilities connecting each pair of network elements (neighbors). The first subprocess then uses the information it acquires to derive the configuration of the associated network and connectivity between the network elements. A second subprocess then obtains a copy of the cross-connect map of each network element for each transmission rate handled by the network element. The second subprocess then uses the (a) cross-connect maps, (b) well-known standards for SONET channel mapping, and (c) network connectivity derived by the first subprocess to derive the way in which each transmission circuit traverses the network via respective network elements and transmission paths.

Specifically, the network administrator notifies NMS 150 via terminal 140 whenever (a) an element is added to a network or (b) a new network, e.g., network 300, is installed and activated, as mentioned above. In doing so, the administrator supplies the address of each newly-added element and the password that NMS 150 may use to communicate with the associated gateway element via the path 151 connecting to that gateway. NMS 150, responsive to such notification, enters the processes that, in accord with an aspect of the invention, determine dynamically the indentity and configuration of each such newly-added element and stores the result of the determination in database 160, as illustrated in FIGS. 2 through 6. Specifically, when the process is entered, it proceeds to block 1, FIG. 2, where it sends a message via the particular path 151 to the pertinent gateway element requesting the identities of the other elements forming the newly-installed network, e.g., network 300, the identities of the gateway's neighboring elements and address of the port circuit board slots that are used to connect the gateway to those neighbors. Upon receipt of that information from the gateway, e.g., MUX 301, the NMS 150 process proceeds to block 2 where it sends a message to each of the identified network elements (e.g., elements 302–304 of network 300) via path 151-3 and gateway 301 to obtain from each of those elements the identities of their neighbors and equipment slots of the port circuit board that are used to connect to the identified neighbors.

The program then proceeds to block 3 where it stores the information that it obtains from each of the network 300 elements in database 160. The program then proceeds to block 4 where, starting from the gateway element 301 and for each of its neighbors, the program determines the configuration of the newly-installed network. In the present example of network 300, the program will determine that the configuration of that network is a ring. The program does this by linking the neighbor information that it obtains from each of the elements forming network 300. (Similarly, if network 200 were the newly-installed network, then the neighbor information would indicate that the configuration of that network comprised a hub. In that case then, the program would assign a relative position that each element, e.g., MUX 203, has in the network with respect to the gateway and then store that information along with with the type of network configuration for network 200 in database 160.) The program then proceeds to block 5 following the foregoing. At block 5, the process stores in database 160 and for each element of network 300 the address of each circuit slot that connects to an external element, e.g., another network or CPE. The program (block 6) then obtains from each MUX forming the associated network (starting with the gateway MUX) a copy of the associated cross-connect map(s). As mentioned above, a cross-connect map lists for each data rate processed by the MUX the addresses of all port circuits and transmission channels supporting the data rate and the source to destination relationship (routing) between such facilities, e.g., port to port, port to channel, or channel to channel addressing.

Figure 4:
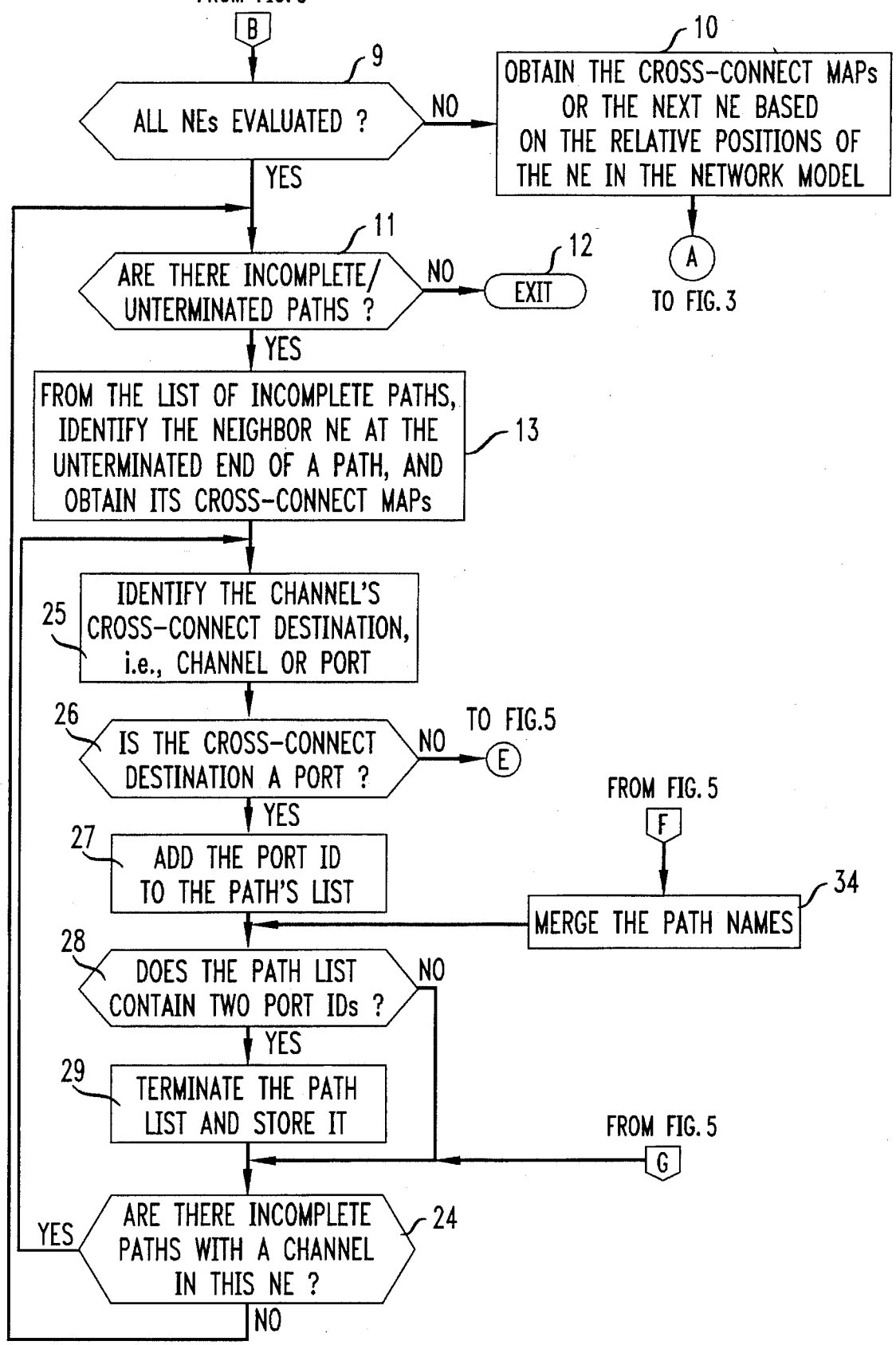

Armed with such information, the program starts to build a map identifying each path traversing the network including the addresses of all components and termination points forming the path. The program thus proceeds to block 7 where it checks to see if it has completed the processing of the cross-connects maps that it obtained at block 6. If that is the case, then the program proceeds to block 9 (FIG. 4). Otherwise, it proceeds to block 8 where it gets the next cross-connect entry of the map that it is currently processing and then proceeds to block 8-1. At block 8-1 the program checks to see if has already associated a path with a component (port or channel) whose address is contained in the cross-map that it is currently processing. If yes, then the program proceeds to block 14. If no, then the program (block 8-2) checks to see if the current entry in the cross-connect map that it is processing (i.e., active map) contains the address of a termination point for a particular path, i.e., a port circuit. If so, then the program (block 8-6) assigns a path name to that path segment and stores the addresses (port, NE, slot, and channel) for each component forming that segment in local memory in association with other segments of the relevant path. The program (block 8-7, FIG. 6) then checks the list of components thus far forming the relevant path to see if it contains the addresses of the termination points for the path. If so, then the program (block 8—8) determines that it has completed "tracing out" the path and stores the list, or data record, for that path in database 160 and then returns to block 7. If no, then the program (block 8-9) concludes that it has not completed tracing out the path end to end. In that case then the program (a) identifies the physical frame slot that supports the outgoing channel associated with the identified port to channel path segment first, and (b) determines, from the information obtained earlier for that slot, the address of the network element connecting to the other end of identified transmission media. (For example, path segment 303-1 shown in FIG. 1.) The program (block 8-10) then goes on to identify the address of the incoming channel of the neighboring network element that is connected via the identified transmission media to the identified outgoing channel of the network element being processed. The program does this using the industry standard that maps a SONET channel into a shared optical transmission facility, e.g., the identified path segment. The address of the latter incoming channel is then added to the above-mentioned list of components. The program then returns to block 7.

If the program (block 8-2, FIG. 3) concludes that the list that it is building does not contain a port, then it proceeds to block 8-3, which indicates that the path segment contains an incoming and outgoing channel, i.e., two channels, but not a port circuit. Note that blocks 8-3 through 8-5 respectively perform substantially the same functions that are performed at blocks 8-6, 8-9 and 8-10, but with respect to one or more channels (e.g., two channels), rather than a port, as noted in the FIG. Accordingly, for the sake brevity and clarity, blocks 8-3 through 8-5 will not be specifically described herein.

If, as mentioned above, the program exits block 8-1 via the "yes" leg and proceeds to block 14, then the program has recognized that one address of the current pair of addresses forming a respective cross-connect entry is part of a path that has been previously identified. The program (block 14) then notes the type of component whose address is the other entry of the current pair of addresses in the map. The program does this based on the format of the address, in which the format of the address of a port is different from the format of an address for a channel. That is, a port address contains different letters and numbers to distinguish it from a channel address. The program (block 15, FIG. 6) thus uses that difference to determine if the address is associated with a port. If so, then the program (block 16) adds the port address (identity) to the path list that the program is building and then checks to see (block 17) if it has identified the end points of the path. If not, then the program returns to block 7 to process the next entry in the cross-connect map that it is currently processing. Otherwise, the program (block 18) stores the entire path list in database 160 and then returns to block 7.

If the identified component is not a port (i.e., it is a channel) then the program (block 19) checks to see if the pair of addresses (obtained at block 8, FIG. 3) of the entry currently being processed are assigned to channels who are associated with two different named (identified) path segments. If so, then the program (block 20) merges the identified path segments into a single path and then proceeds to block 17 to determine if the merged segments contain two port circuits (end points) and thus represents a complete path. If the program exits via the "no" leg of block 19, then it (block 21) adds the identity of the channel to the aforementioned path list and then proceeds to block 7 via blocks 22 and 23. It is noted that the functions performed at block 22 and 23 are similar to those performed at blocks 8-9 and 8-10, respectively.

If the program exits block 7 (FIG. 3) via the "yes" leg, then the program (block 9, FIG. 4) checks to see if it has completed processing all elements forming the newly-installed network (or a network which has changed in some way). If no, then the program (block 10) obtains the cross-connect map(s) from the network element having the next position in the network relative to the gateway element and then returns to block 7. Otherwise, the program (block 11) checks to see if there are still one or more incomplete paths whose terminations are not yet known by the program and exits (block 12) if that is not the case. Otherwise, the program begins the processing of "left-over" path segments, if any. The program processes each such segment by first (block 13) identifying the network element containing the unterminated end of the segment and the appropriate cross-connect map associated with the identified network element. The program then proceeds to block 25.

Figure 5:
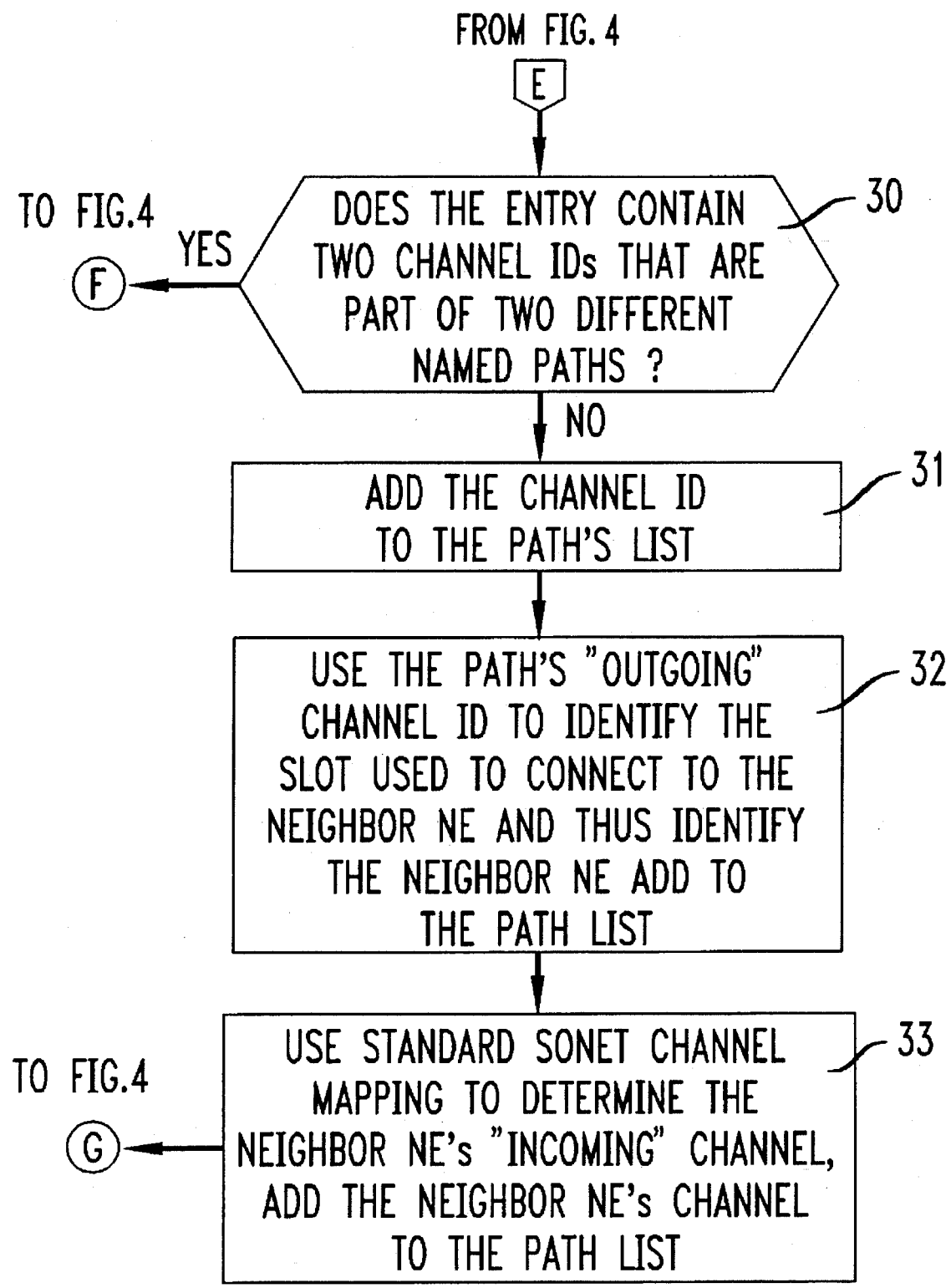
Figure 6:
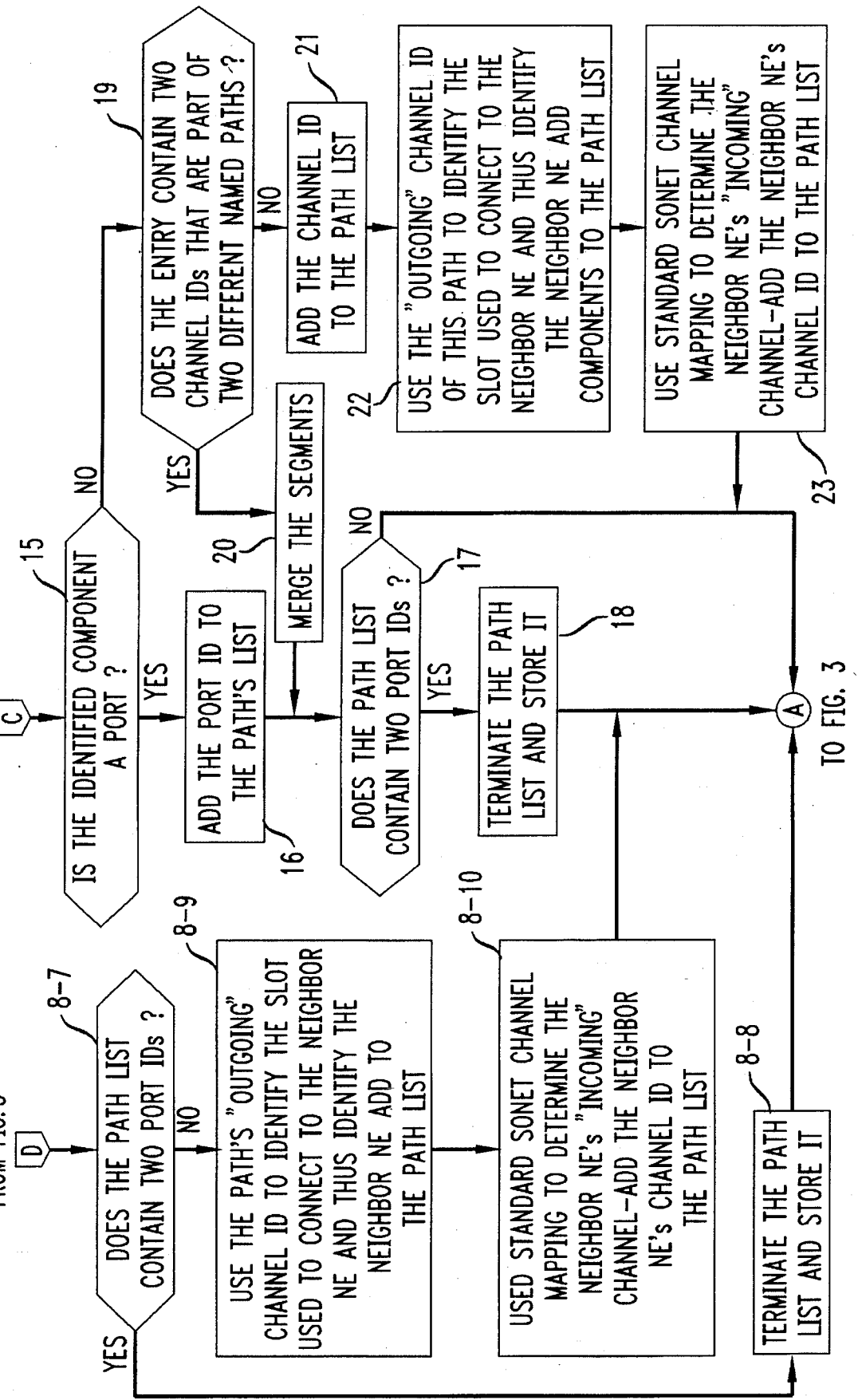

The program (block 25) notes from the cross-connect map being processed and, particularly, the entry identifying the address of the channel that is at one end of the incomplete segment, the other address forming the associated pair of addresses contained in that entry. As mentioned above, the program does this based on the format of the address, in which the format of the address of a port is different from the format of an address for a channel, as mentioned above. The program (block 26) then uses that difference to determine if the other address is associated with a port. If not, then the program proceeds to block 30 (FIG. 5). Otherwise, it adds (block 27) the port address (identity) to the path list such that the identified channel is logically connected in the path to the identified port. Similarly, the program (block 28) then determines if the path contains two ports, which ports would represent the end points of the path. If that is not the case, then the program proceeds to block 24 to process the next unterminated path segment in the network element identified at block 13. Otherwise, the program (block 29) stores the entire path list in database 160 and then proceeds to block 24.

If the identified component is not a port (i.e., it is a channel) then the program (block 30, FIG. 5) checks to see if the addresses of the pair of addresses of the entry currently being processed are associated with respective channels who are associated with two different named (identified) path segments. If so, then the program proceeds to block 34. If the program exits via the "no" leg of block 30, then it (block 31) adds the identity of the channel to the path list and then returns to block 24 via blocks 32 and 33. It is noted that functions performed at block 32 and 33 are similar to those performed at blocks 8-9 and 8-10, respectively. (It is noted that if the program exits via the "no" leg of block 24, then it proceeds to block 11 to continue its processing of incomplete paths.) If the program proceeds to block 34 (FIG. 4) then it merges the identified path segments into a single path and then proceeds to block 28 to determine if the merged segments contain two ports (end points) and thus represent a complete path.

Turning now to FIG. 7, there is shown a simplified block diagram of a MUX, in which a MUX comprises a plurality of so-called MULDEMs (MULtiplexer-DEMultiplexer) 401-1 through 401-N. A MULDEM, more particularly, includes, inter alia, an Optical signal to Electrical signal (O/E) converter 402, demultiplexer 403, switching fabric 404, multiplexers 405-1 through 405-j and associated Electrical to Optical (E/O) converters 406-1 through 406-j connected to respective optical communications paths 412-1 through 412-N. In particular, 0/E 402 converts optical signals that it receives via optical transmission medium (path) 407-1 into electrical signals for presentation to demultiplexer 403. Demultiplexer 403 demultiplexes the "high-speed" signals received over path 407 into a number of "slower-speed" data streams, three of which, 403-1 through 403-3, are shown in FIG. 7. Such demultiplexing is based on the addresses of the logical channels associated with the incoming signals. The result of such demultiplexing is then presented to respective inputs of switch 404. Switch 404, in turn and in accord with its associated cross-connect map, routes (switches) the contents of each of the data channels that it receives from demultiplexer 403 to an input of one of the multiplexers 405-1 through 405-j. (As mentioned above, a cross-connect map associates an incoming data port and associated circuit pack (i.e., channel address) with an outgoing data port and associated circuit pack (channel address.) Switch 404 may also route a data channel to some other path, such as path 413 extending to particular CPE (not shown in the FIG.). Each multiplexer 405, in turn, multiplexes signals that it receives via its associated inputs to its output terminal extending to the input of an associated output O/E 406. The output O/E 406, in turn, converts electrical signals that it receives into optical signals for presentation to an associated optical transmission path 412, e.g., path 412-1.

A technician initially inputs the cross-connect maps that control the routing of signals through MULDEMs 401-1 through 401-N, respectively, in the associated processor 408. Processor 408 then supplies a particular cross-connect map to an associated switch 404 via path 409, e.g., 409-1. Switch 404 then routes the signals that it receives in accord with the routing specified in the associated cross-connect map. Once the cross-connect maps have been stored in processor 408, then, in accord with the invention, management system 150 (FIG. 1) may obtain copies of the maps to identify the configuration of the associated network and paths (connections) that traverse the network, as discussed above. If the technician or OS thereafter changes a cross-connect map to effect a change in the routing of particular signals through the associated switch 404, then the associated processor 408 supplies the change to switch 404. Switch 404, in turn, changes the routing of the affected signals. In addition, processor 408 communicates the change to its associated gateway MUX via the system overhead channel, represented in the FIG. by path 411. (The incoming overhead channel is represented in the FIG. by path 410.) The gateway MUX, in turn, and in the manner discussed above, supplies the change to system 150. System 150, in turn, updates the database 160 record affected by the change.

Figure 8:
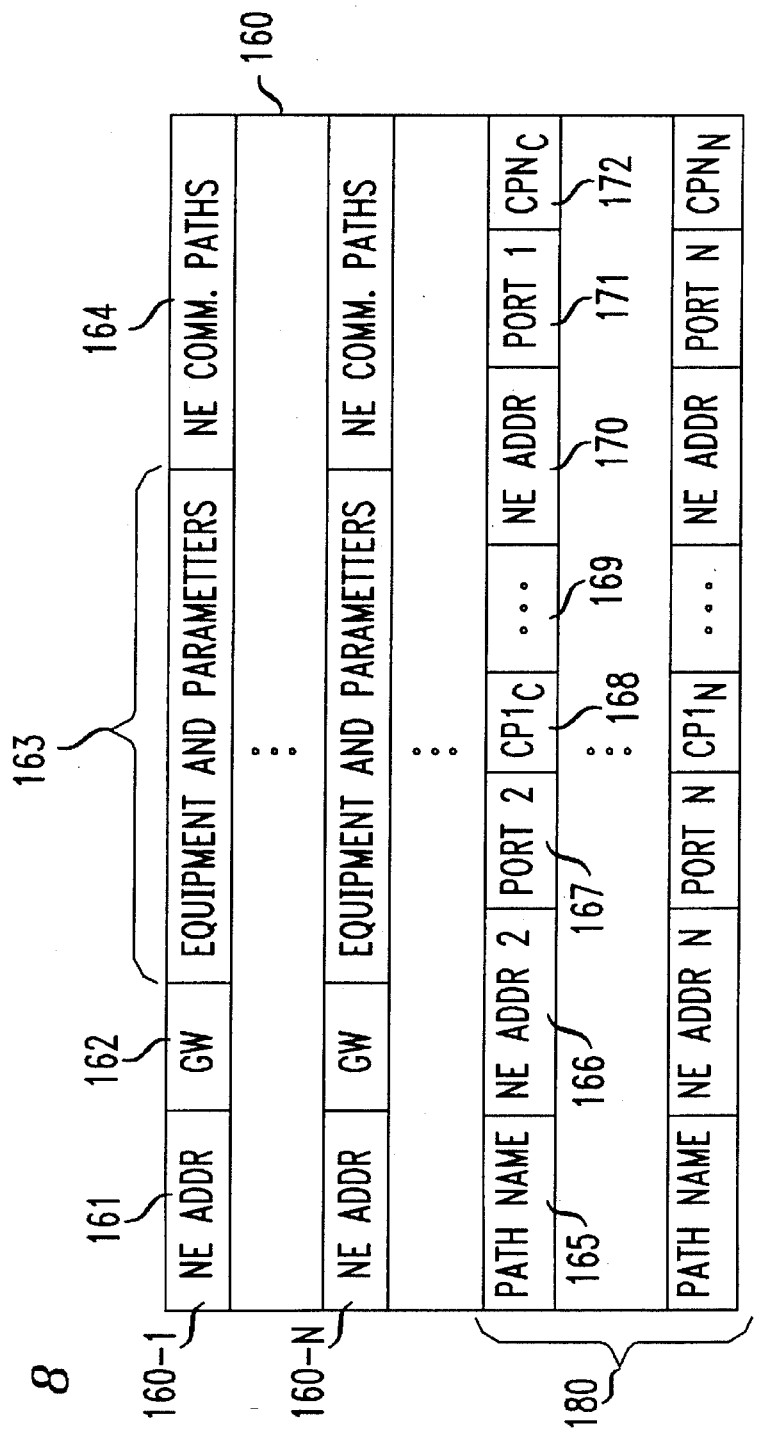
FIGS. 8 and 9 illustrate examples of the data records that are stored in the database of FIG. 1.
Figure 9:
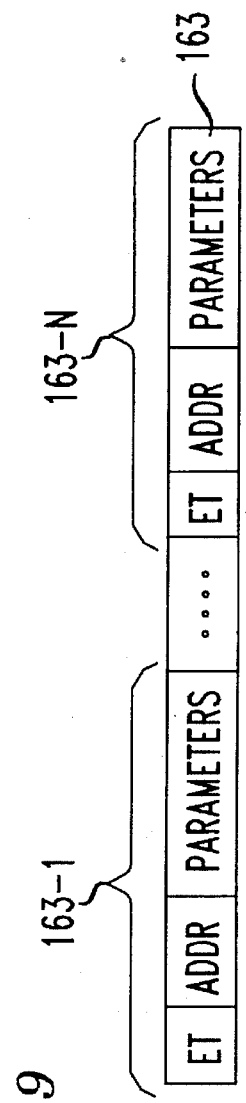

Illustrative examples of such records are shown in FIG. 8. System 150 creates and stores the records in database 160 in accord with the operation of the program of FIGS. 2 through 6, as discussed above. Specifically, the records 160-1 through 160-n are associated with respective network elements and identify a particular NE (MUX) in field 161 and indicates in field 162 whether the NE is a gateway. Other fields of a record respectively characterize the equipment forming a network element, associated addresses and parameters (field 163). They also identify the paths which are routed through the network element (field 164). Records 180 identify such paths, as will be explained below. An expanded version of field 163 is shown in FIG. 9, and is formed from subfields 163-1 through 163-N. A subfield identifies, more particularly, (a) equipment type (e.g., demultiplexer, optical-to-electrical converter, etc.), (b) the address of the equipment and (c) associated parameters. Such parameters specify, for example, line coding, thresholds, etc., and include an indication (e.g., a flag) noting whether the equipment connects to a neighboring NE, and if so, the identity of the neighboring equipment (port). Returning to FIG. 8, records 180 respectively identify the various paths traversing a network, e.g., network 300 (FIG. 1). This is done by identifying a path by its associated name (field 165) as specified by system 150; the address of the NE at one end of the path (field 166), the address of the port (field 167) and address of the circuit pack (field 168) in that NE which terminates that end of the path: the channels and associated circuit packs contained in intervening NEs (field 169); and the address of the NE at the other end of the path (field 170) its associated port (field 171) and circuit pack (field 172). The following is a simple example of such a record:

PATH1:NE1:PORT2:CP1c:channel A:CP1b:NE2:channel H:CP2a:port3:CP2c and indicates that the path associated with the name of path1 starts at circuit pack 1c contained in port 2 of a network element whose address is NE1 and leaves that NE via channel A associated with circuit pack 1b and is received at a circuit pack 2a of network element NE2 and is then cross-connected via channel H (dropped) to a point external to the network via circuit pack 2c of port 3 of NE2. A more complicated path record would be similarly interpreted.

The foregoing is merely illustrative of the principles of the invention. Those skilled in the art will be able to devise numerous arrangements, which, although not explicitly shown or described herein, nevertheless embody those principles that are within the spirit and scope of the invention. For example, it is apparent that the claimed invention may be used in other types of networks, such as cable and wireless networks.

We claim:

1. A method of operating a network management system, said network management system supporting the operations of an associated network comprising a plurality of network elements interconnected via respective communications paths, said method comprising the steps of responsive to a change in said network, identifying each of said network elements, obtaining from each of the identified network elements information indicative of at least (a) identities of components forming the network element, (b) identities of neighbor network elements and (c) configuration of the network element, and determining from the information obtained from each of the identified network elements the interconnections between network elements and the configuration of said network, in which said network may be one of a plurality of different network configurations, wherein said step of obtaining includes the step of communicating with a gateway network element to obtain said information, and wherein said information includes a cross-connect map associated with a respective data rate.

2. The method of claim 1 wherein said step of communicating includes the step of supplying a password associated with said gateway and the address of said gateway to said network management system so that said network management system may communicate with said gateway via a communications path connecting said network management system to said gateway.

3. A method of operating a network management system, said network management system supporting the operations of an associated network comprising a plurality of network elements interconnected via respective communications paths, said method comprising the steps of responsive to a change in said network, identifying each of said network elements, obtaining from each of the identified network elements information indicative of at least (a) identities of components forming the network element, (b) identities of neighbor network elements and (c) configuration of the network element, and determining from the information obtained from each of the identified network elements the interconnections between network elements and the configuration of said network, in which said network may be one of a plurality of different network configurations, wherein said information includes cross-connect maps associated with respective data rates.

* * * * *